United States Patent [19]

Walker

[11] 4,105,358

[45] Aug. 8, 1978

[54] SUPPORT DEVICE FOR PIPE DRILLER

[76] Inventor: Richard J. Walker, 16805 - 93rd St., Bristol, Wis. 53104

[21] Appl. No.: 726,816

[22] Filed: Sep. 27, 1976

[51] Int. Cl.[2] .......... B23B 45/14

[52] U.S. Cl. .......... 408/108; 125/20; 269/270; 408/103

[58] Field of Search .......... 408/87, 97, 104, 105, 408/106, 108, 101, 1R, 103, 92; 269/265, 268, 270; 125/20

[56] References Cited

U.S. PATENT DOCUMENTS

| | | | |
|---|---|---|---|
| 338,021 | 3/1886 | Bennett | 408/101 |
| 2,287,354 | 6/1942 | Misch | 408/101 |
| 2,427,994 | 9/1947 | Merrill | 408/97 |
| 2,911,859 | 11/1959 | Longley et al. | 408/1 |
| 3,090,260 | 5/1963 | Brooks et al. | 408/92 |
| 3,293,952 | 12/1966 | Fairbanks | 125/20 |
| 3,847,501 | 11/1974 | Doty | 408/108 |

*Primary Examiner*—Othell M. Simpson
*Assistant Examiner*—W. D. Bray
*Attorney, Agent, or Firm*—Neil E. Hamilton

[57] ABSTRACT

A support device for a pipe driller and particularly for sewer pipe which eliminates excavation from the underside of the pipe. A support means engages a standard pipe driller and arm members extend from the support. The arm members are pivotally secured to the support and extend in one direction to partially surround the pipe. The arm members also extend in the opposite direction and are operable with screw means to secure the opposing arms against the pipe. The pipe contacting portions of the arm are preferably arcuate in configuration and surround the pipe over not more than ninety degrees of its radius and above the lowermost portion of the pipe.

6 Claims, 7 Drawing Figures

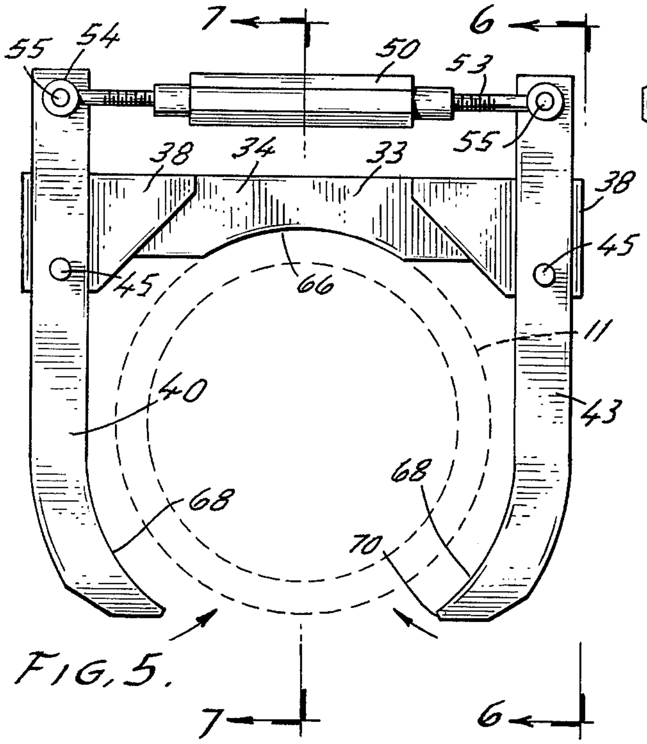
FIG. 5.
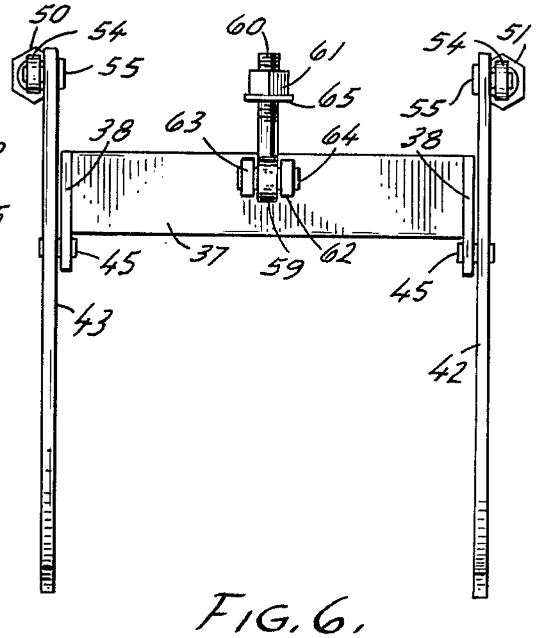
FIG. 6.
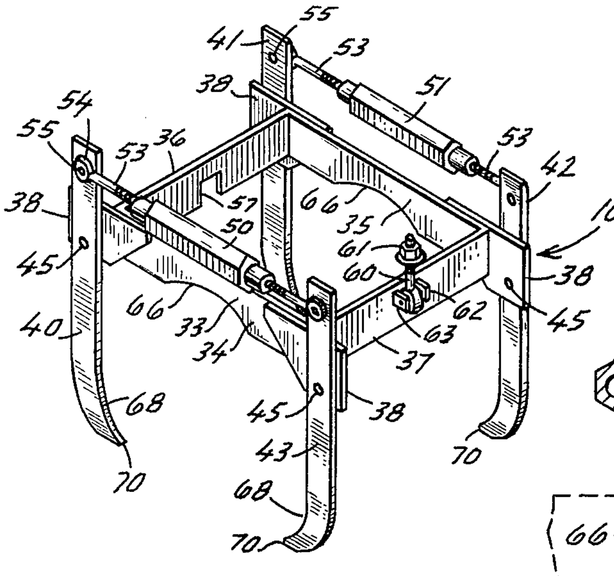
FIG. 4.
FIG. 7.
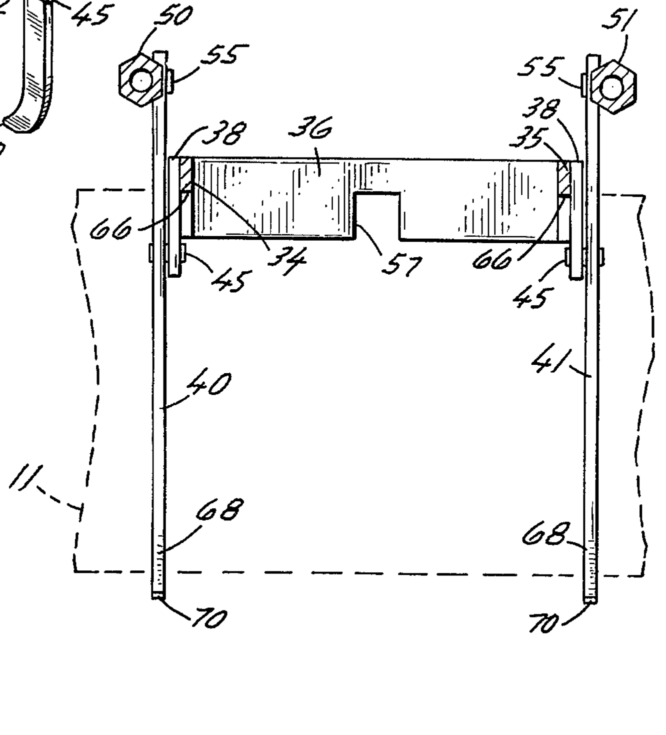

SUPPORT DEVICE FOR PIPE DRILLER

BACKGROUND OF THE INVENTION

This invention relates to a securing means for a drilling device. More particularly, it relates to a holder for a pipe drilling device which is clampable to a pipe over only a lower portion thereof thereby eliminating excavating under the pipe while affording a secure attachment.

In the tapping or drilling of sewer pipe to attach a lateral pipe thereto, it is common practice to utilize a power driven sewer tap device having a cutting element powered with a hydraulic motor. It is necessary to secure such a device firmly to the pipe, and the usual manner of doing so is to loop a chain around the pipe. This is disadvantageous in that it requires excavating under the pipe which is time consuming and can be dangerous where a deep excavation is required. Such chain type attachment is shown in U.S. Pat. No. 216,379 whereas surrounding bands are disclosed in U.S. Pat. No. 2,050,985. In U.S. Pat. No. 2,418,234 an underlying base plate is described for a drill jig, whereas in U.S. Pat. No. 2,427,994 a hook and saddle arrangement is illustrated. All of the foregoing require placement of a securing device under the pipe and consequently excavating thereunder.

It is an advantage of the present invention to provide a holder for a drilling device for pipe which eliminates excavating beneath the pipe. Other advantages are a drill holder which is easily secured to the pipe; is adaptable to various types of drilling devices; is composed of a minimum of parts and is easily manufactured and portable.

SUMMARY OF THE INVENTION

The foregoing advantages are accomplished and the shortcomings of the prior art are overcome by the present pipe drill holder which is composed of a support means for the drilling unit with arm members extending in opposing directions from the support and pivotally attached thereto. Screw type means are operatively associated with the arm members at one end to move the opposing ends toward and away from the pipe surface and engage the pipe along a multiplicity of contact points above the bottom portion of the pipe. In a preferred embodiment two pairs of opposing arm members are employed and are engaged by turnbuckle linkage means to move them in opposing directions. The pipe-engaging portions of the arms are concave and terminate in engagement above the lowermost surface of the pipe. The support means also has concave contacting portions to partially surround the uppermost portions of the pipe and clamping means to engage the pipe drill.

BRIEF DESCRIPTION OF DRAWINGS

A better understanding of the present pipe drill holder will be afforded by reference to the drawings wherein:

FIG. 4 is a perspective view of the pipe driller support device of this invention.

FIG. 5 is an enlarged side elevational view of the support device shown in FIG. 4 engaging a pipe shown in broken lines.

FIG. 6 is an end view taken along line 6—6 of FIG. 5.

FIG. 7 is a view in vertical section taken along line 7—7 of FIG. 5.

DESCRIPTION OF THE PREFERRED EMBODIMENT

Figure 1:
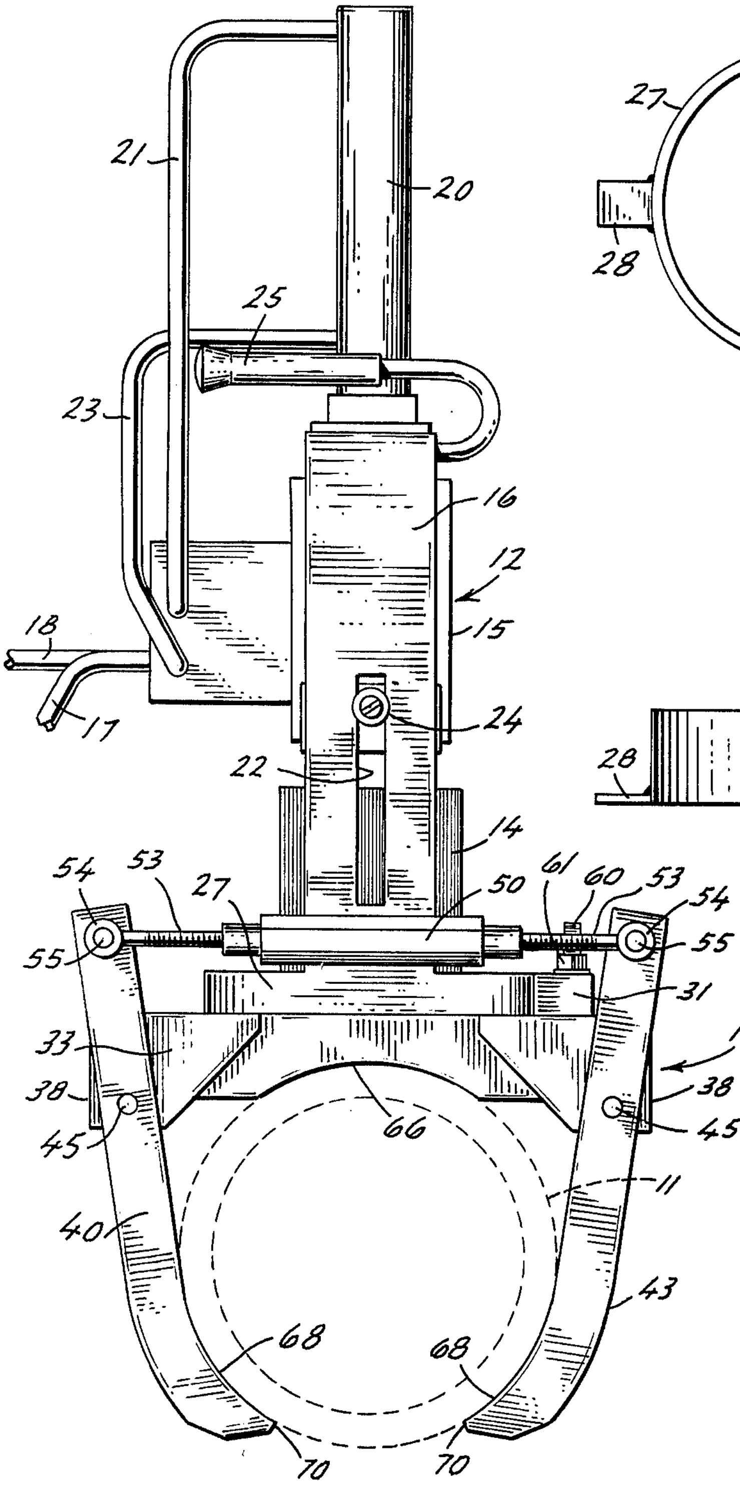
FIG. 1 is a view in side elevation showing the pipe drill holder engaging the pipe (shown in broken lines) and supporting the drilling device which is illustrated somewhat schematically.
Figure 2:
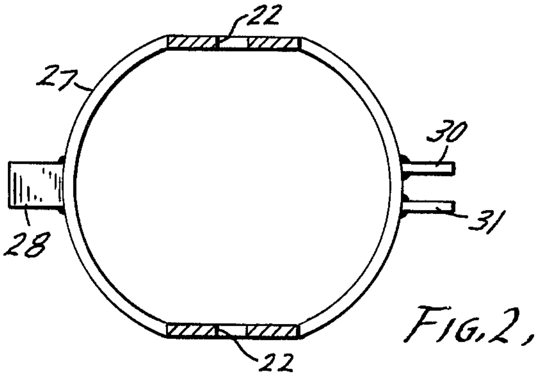
FIG. 2 is a view in horizontal section illustrating a base portion of the drill member which engages the support means of the support device.
Figure 3:
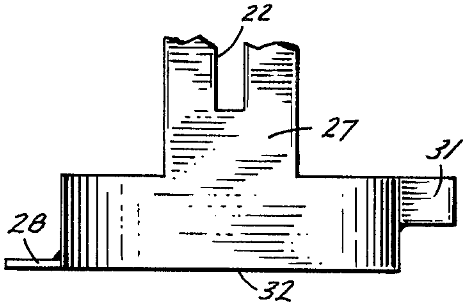
FIG. 3 is a partial view in side elevation of the drill member base portion shown in FIG. 2.

Proceeding to a detailed description of the present invention, the support device is generally indicated by the numeral 10 and is shown in FIG. 1 in engagement on the surface of pipe 11 and supporting a drilling device 12. Although any powered drilling device for a cylindrical object would be operable with support device 10, a brief description will be given for one of the preferred operable types.

Drilling device 12 is manufactured by Smith and Loveless, Division of Union Tank Car Co., Lenexa, Kansas, under the brand name "Shewer Tap". It comprises a diamond core cutter 14 powered by a hydraulic motor 15 supported in frame 16. Hydraulic lines 17 and 18 supply hydraulic fluid under pressure to and from motor 15. A hydraulic ram 20 moves cutter 14 toward and away from pipe 11 by means of one of the hydraulic lines 21. The movement of cutter 14 toward and away from the pipe is effected by motor 15 being retained in guide slot 22 by means of guide member 24. One of the handle supports is shown at 25. A support base 27 is integrally formed as a part of frame 16 and includes a lower flange 28 and a pair of spaced bars 30 and 31 which are disposed in elevated position with respect to flange 28.

As is best seen in FIG. 4, support device 10 includes a support frame 33 formed by opposing side bars 34, 35 and end bars 36 and 37. Flange plates 38 are integrally secured to side bars 34 and 35 and provide a means of pivotal attachment for arm members 40, 41, 42 and 43 which are pivotally attached by means of stub axles 45. Arm members 40, 43 and 41, 42 are attached in a paired relationship through linkage means such as standard turnbuckles 50 and 51, respectively. The attachment is afforded by standard screw arms 53 threadably secured in turnbuckles 50 and 51 and mounted on arms 40–43 by means of eye portions 54 mounted around shoulder screws 55 in a pivotal manner.

As best seen in FIG. 7, end bar 36 has a notch 57 for receiving flange 28 on support base 27 of drilling device 12. Additional securing of drilling device 12 is provided by pivotal bolt 60 with nut 61 and washer 65, the pivotal attachment provided by eye 59 secured around axle 64 attached to bars 62 and 63.

It will be seen in FIGS. 1, 4 and 5 that side bars 34 and 35 have concave portions 66 for seating on the top sections of the surface of pipe 11 and arms 40–43 have arcuate contacting portions 68 and contacting points 70 for the same purpose.

OPERATION

A better understanding of the advantages of the support device 10 will be had by a description of its operation. Support device 10 will be usually manufactured and transported as shown in FIG. 4. When it is desired to drill a hole in a pipe 11, which indicates a sewer line, for purposes of attaching a lateral line, a hole will be excavated around both sides of pipe 11 down to a level to just expose the sides near the bottom. Support device 10 will be seated around pipe 11 in a loose manner with turnbuckles turned in a manner to move arms 40, 43 and 41, 42 away from each other. Concave portions 66 of side bars 34 and 35 will be seated on the top section of pipe 11 (as best shown in FIGS. 1 and 5) but at an angle of approximately 45° from vertical top (2 or 10 o'clock position). The support base 27 of drilling device 12 will be placed within the confines of support frame 33 with flange 28 orientated in notch 57 of end bar 36 and bars 30 and 31 straddling pivot bolt 60. The bottom surface 32 of drilling support base will rest on the surface of pipe 11 and drilling device 12 will be secured between the pipe 11 and support frame 33 by tightening clamp means formed in part by nut 61 forcing washer 65 against bars 30 and 31 and flange 28 in notch 57. Next, turnbuckles 50 and 51 will be turned to move arm members 40, 43 and 41, 42 toward each other to secure arcuate contacting portions 68 around pipe 11 and contacting points 70 in engagement with the pipe. The assembled and secured unit will appear as in FIG. 1 with arms 40–43 free of contact with the lowest portion of the pipe and with less than 90° contact.

The drilling device will be operated in the usual manner and, most importantly, without excavating below and around the bottom of pipe 11. Neither will it be necessary to place an object around the bottom of pipe 11 such as chains or straps. To remove support device 10 from pipe 11, the preceding steps are merely reversed.

While frame 33 is shown as separate from support base 27 of drilling device 12, it could be integrally formed with base 27, such as by means of welding or integrally molding. Arm members 40–43 with arcuate contacting portions 68 are designed to engage an eight or ten inch diameter size pipe. However, they could be designed to engage pipe as small as four inch diameter and as large as sixteen inch diameter. Arm members 40–43 are shown in a paired relationship. Although not as effective, only one pair of arm members could be employed. Further concave portions 66 could be eliminated.

All of the parts employed in composing support device 10 are readily available on the market or can be easily fabricated from steel bar stock. The flange plates are readily welded to side bars but could be molded. If desired and while not as sturdy a structure, they may be fabricated from aluminum or heavy rigid plastic such as nylon.

It will thus be seen that through the present invention there is provided a support device which is very efficient in its operation yet employs a minimum number of parts. The unit of this invention avoids excavating around the bottom pipes and/or the placement of chains or straps beneath them. The present support device is easily transportable yet sturdy in its construction. It can be fabricated from readily available components without any special tooling or materials.

The foregoing invention can now be practiced by those skilled in the art. Such skilled persons will know that the invention is not necessarily restricted to the particular embodiment presented herein. The scope of the invention is to be defined by terms of the following claims as given meaning by the preceding description.

I claim:

1. A support device for receiving and positioning a drilling device on a pipe surface, said drilling device having a support base presenting opposing lateral sides and a self-contained raising and lowering mechanism for the drill of said drilling device, said support device comprising a frame member defining two pairs of arm members extending from said frame member in a first and a second direction and pivotally secured thereto, means operatively connected to said arm members to move said arm members toward and away from said pipe surface, said means to move said arm members positioned in conjunction with said arm members in said first direction, said arm members extending in said second direction having arcuate portions to directly contact said pipe along a multiplicity of points, said frame member comprising opposing side members with concave portions to engage the top section of said pipe surface and clamp means defined by said opposing sides of said drilling device support base and said opposing side members of said frame member, so that said drilling device is readily received in said frame member and retained therein independently of said raising and lowering mechanism.

2. The support device as defined in claim 1 wherein said means to move said arm members toward and away from said pipe includes linkage means operable from between the pairs of said arm members.

3. The support device as defined in claim 2 wherein said linkage means to move said arm members toward and away from said pipe includes a turnbuckle.

4. The support device as defined in claim 3 wherein said arcuate contacting portions contact said pipe only not more than ninety degrees.

5. The support device as defined in claim 4 wherein said arcuate contacting portions are free of contact with the bottom portion of said pipe opposite said drilling device.

6. The support device as defined in claim 1 wherein said clamp means further comprises a pivotal screw-down bolt member carried by one of said opposing side members of said frame member for attachment to one side of said drilling device support base and a flange and slot arrangement operatively associated with the opposite side of said drilling device support base and said frame member.

* * * * *